(12) United States Patent
Kim et al.

(10) Patent No.: US 10,965,380 B1
(45) Date of Patent: Mar. 30, 2021

(54) APPARATUS AND METHOD FOR NONLINEAR EQUALIZATION BASED ON ABSOLUTE OPERATION

(71) Applicant: KOREA ADVANCED INSTITUTE OF SCIENCE AND TECHNOLOGY, Daejeon (KR)

(72) Inventors: Hoon Kim, Daejeon (KR); Yukui Yu, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/924,725

(22) Filed: Jul. 9, 2020

(30) Foreign Application Priority Data

May 7, 2020 (KR) .................. 10-2020-0054277

(51) Int. Cl.
*H04B 10/2543* (2013.01)
*H04B 10/61* (2013.01)
*H04B 10/69* (2013.01)
*H04B 10/255* (2013.01)
*H04B 10/2557* (2013.01)
*H04B 10/2563* (2013.01)
*H04B 10/60* (2013.01)
*H04B 10/50* (2013.01)
*H04B 10/2507* (2013.01)

(52) U.S. Cl.
CPC ..... *H04B 10/6163* (2013.01); *H04B 10/2543* (2013.01); *H04B 10/6971* (2013.01); *H04B 10/255* (2013.01); *H04B 10/2557* (2013.01); *H04B 10/2563* (2013.01); *H04B 10/25073* (2013.01); *H04B 10/50* (2013.01); *H04B 10/60* (2013.01)

(58) Field of Classification Search
CPC ............ H04B 10/6163; H04B 10/6971; H04B 10/2543; H04B 10/25073; H04B 10/50; H04B 10/60; H04B 10/255; H04B 10/2563; H04B 10/2557
USPC .................................. 398/140–172, 182–214
See application file for complete search history.

(56) References Cited

U.S. PATENT DOCUMENTS

| | | | | |
|---|---|---|---|---|
| 2013/0108260 A1* | 5/2013 | Yan | ..................... | H04B 10/2572 398/25 |
| 2013/0230313 A1* | 9/2013 | Yan | ..................... | H04L 25/0202 398/25 |
| 2013/0243433 A1* | 9/2013 | Yan | ..................... | H04B 10/2507 398/65 |
| 2013/0272719 A1* | 10/2013 | Yan | ..................... | H04L 25/0202 398/159 |

(Continued)

OTHER PUBLICATIONS

Diamantopoulos etal, On the Complexity Reduction of the Second Order Volterra Nonlinear Equalizer for IM DD Systems, Feb. 2019, JLT vol. 37 No. 4, All Document. (Year: 2019).*

(Continued)

*Primary Examiner* — Dibson J Sanchez
(74) *Attorney, Agent, or Firm* — Heslin Rothenberg Farley & Mesiti P.C.

(57) ABSTRACT

Various example embodiments relate to an apparatus and method for nonlinear equalization based on an absolute operation, and may be configured to generate coefficients and compensate for nonlinear distortions by using an absolute operation for an input signal based the coefficients.

6 Claims, 5 Drawing Sheets

(56) References Cited

U.S. PATENT DOCUMENTS

2016/0036554 A1* 2/2016 Yasuda .............. H04B 10/6163
398/65
2017/0366274 A1* 12/2017 Maeda ............... H04B 10/2572
2018/0254769 A1* 9/2018 Alic ................... H03H 21/0023

OTHER PUBLICATIONS

Zhang et al, Single lane 180 Gbs DB PAM4 signal transmission over an 80 km DCF free SSMF link, Feb. 2017, Optics Letters vol. 42 No. 4, All Document. (Year: 2017).*

* cited by examiner

APPARATUS AND METHOD FOR NONLINEAR EQUALIZATION BASED ON ABSOLUTE OPERATION

This application claims the priority benefit of Korean Patent Application No. 10-2020-0054277, filed on May 7, 2020, Korean Intellectual Property Office, the disclosure of which is incorporated herein by reference.

BACKGROUND

Field of the Invention

The following example embodiments relate to an apparatus and operation method thereof, and more particularly, to an apparatus and method for nonlinear equalization based on an absolute operation.

Description of Related Art

All the systems operate in the nonlinear regime when the signal's amplitude is high. Even a linear system may operate in a nonlinear fashion when the signal's amplitude exceeds the operation range. Some systems are nonlinear by nature. One example is the intensity-modulation (IM)/direct-detection (DD) optical transmission system. It is the simplest of all optical transmission schemes. However, the channel nonlinearity caused by the nonlinear components in the link like driver amplifiers, optical modulators and photo-detector (PD) etc., limits the transmission performance. The dispersion also induces severe nonlinear distortions due to square-law detection of DD receiver.

Volterra series theory offers a popular and general way to design nonlinear equalizers since it can model a wide range of real-world systems. Thus, the full Volterra nonlinear equalizer (VNLE) can be utilized to compensate for those nonlinear distortions effectively. However, the biggest concern about the VNLE is its high implementation complexity, which makes it unsuitable for most cost-sensitive systems. The pruned VNLE can lower the complexity of VNLE by setting the coefficients with small value to be zero. A simplest pruned VNLE is the polynomial nonlinear equalizer (PNLE), where the polynomial terms composed of signals sampled at the same time. However, these pruned VNLEs would be too complicated and/or expensive to be used for cost-sensitive systems since numerous multiplication operations are still required.

SUMMARY

Embodiments of the inventive concept may provide an apparatus for nonlinear equalization having lower implementation complexity than a Volterra nonlinear equalizer.

Embodiments of the inventive concept may provide an apparatus for nonlinear equalization which may minimize performance deterioration for compensating for nonlinear distortions and dramatically reduce implementation complexity.

An apparatus for nonlinear equalization according to various example embodiments may include a coefficient updating module for generating coefficients, and a nonlinear equalizer configured to compensate for nonlinear distortions by using an absolute operation for an input signal, based on the coefficients.

An operating method of an apparatus for nonlinear equalization according to various example embodiments may include generating coefficients, and compensating for nonlinear distortions by using an absolute operation for an input signal, based on the coefficients, through a nonlinear equalizer.

A transmitter according to various example embodiments may include a signal generation unit configured to generate a signal for transmission, a nonlinear equalization unit which has a nonlinear equalizer configured to compensate for nonlinear distortions by using an absolute operation for an input signal from the signal generation unit, a digital-analog conversion unit configured to perform a digital-analog conversion on an input signal from the nonlinear equalization unit, and an intensity modulation unit configured to perform intensity modulation on an input signal from the digital-analog conversion unit.

A receiver according to various example embodiments may include a direct detection unit configured to perform directly detection on an input signal, an analog-digital conversion unit configured to perform an analog-digital conversion on an input signal from the direct detection unit, a nonlinear equalization unit which has a nonlinear equalizer configured to compensate for nonlinear distortions by using an absolute operation for an input signal from the analog-digital conversion unit, and a data recovery unit configured to recover data from an input signal from the nonlinear equalization unit.

An apparatus for nonlinear equalization according to various example embodiments may improve transmission performance for a signal by effectively compensating nonlinear distortions based on an absolute operation. At this point, as the apparatus for nonlinear equalization according to various example embodiments uses an absolute operation, in comparison with a general apparatus for nonlinear equalization using a multiplication operation, implementation complexity and power consumption may be reduced. In other words, the apparatus for nonlinear equalization according to various example embodiments may have a certain level of performance, e.g., similar performance with Volterra nonlinear equalizer (VNLE), and reduce implementation complexity and power consumption.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Hereinafter, some example embodiments will be described in detail with reference to the accompanying drawings.

A general apparatus for nonlinear equalization is divided into a linear equalization unit and a nonlinear equalization unit. At this time, the nonlinear equalizer may compensate for nonlinear distortions based on numerous multiplication operations. For example, the nonlinear equalizer may compensate for nonlinear distortions based on a multiplication operation such as $x_k \cdot x_l$, and here, $x_k$ may indicate a discrete-time sample input to the nonlinear equalizer in time index k. However, the multiplication operation has a high implementation complexity and may consume a lot of power.

Figure 1:
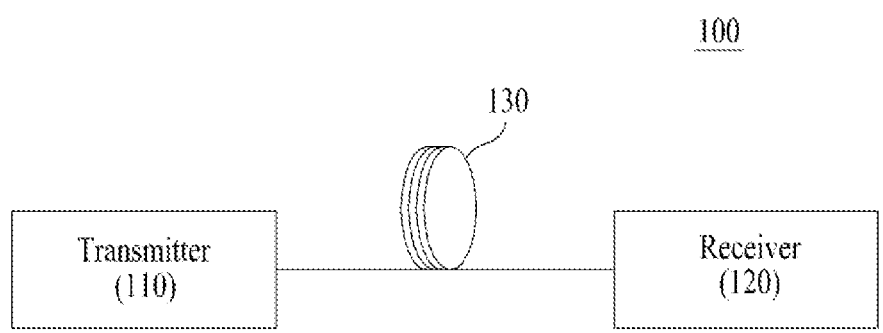
FIG. 1 is a drawing illustrating an optical communication system according to various example embodiments.

FIG. 1 is a drawing illustrating an optical communication system 100 according to various example embodiments.

Referring to FIG. 1, the optical communication system 100 according to various example embodiments may be a direct modulated laser (DML) based intensity-modulation (IM)/direct-detection (DD) system. Such optical communication system 100 may include a plurality of electronic devices 110,120, i.e., a transmitter 110 and a receiver 120. At this time, the transmitter 110 and the receiver 120 may communicate through an optical fiber 130. Also, the transmitter 110 and the receiver 120 may perform interface through a fiber channel of the optical fiber 130. Here, the transmitter 110 may be a DML based transmitter.

Figure 2:
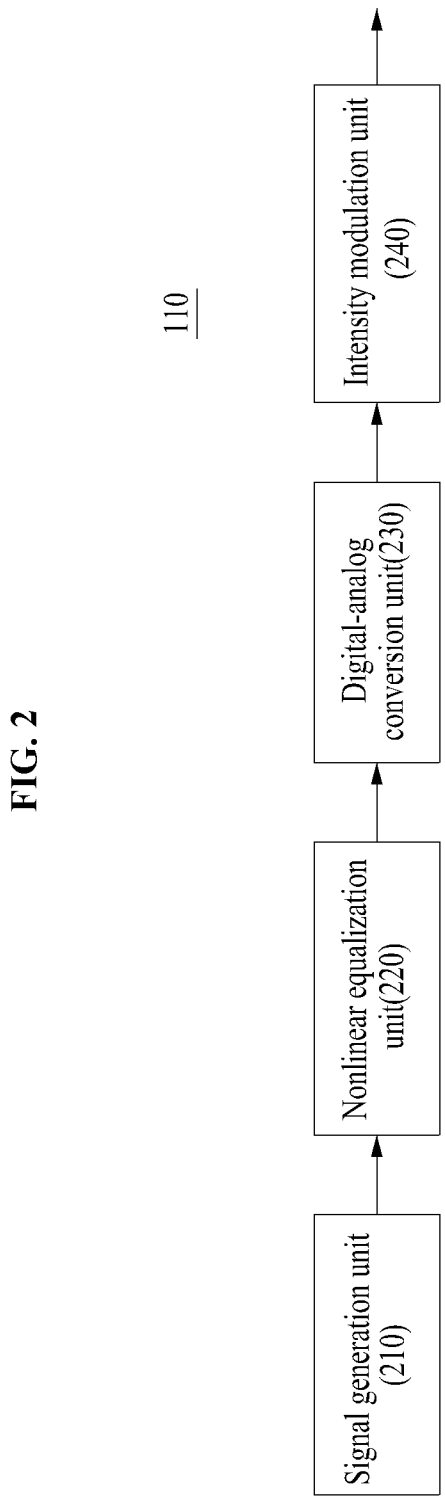
FIG. 2 is a drawing illustrating a transmitter according to various example embodiments.

FIG. 2 is a drawing illustrating the transmitter 110 according to various example embodiments.

Referring to FIG. 2, the transmitter 110 according to various example embodiments may include a signal generation unit 210, a nonlinear equalization unit 220, a digital-analog conversion unit 230, and an intensity modulation unit 240. The signal generation unit 210 may generate a signal for transmission. The nonlinear equalization unit 220 may include a linear equalizer and a nonlinear equalizer. The linear equalizer may perform pre-compensation for distortions which are expected to occur in the optical fiber 130. The nonlinear equalizer may compensate for nonlinear distortions for an input signal from the signal generation unit 210. The digital-analog conversion unit 230 may perform a digital-analog conversion for an input signal from the nonlinear equalization unit 230. The intensity modulation unit 240 may perform intensity modulation (IM) for an input signal from the digital-analog conversion unit 230. Through this, the transmitter 110 may transmit a signal to the receiver 120 based on an output signal from the intensity modulation unit 240.

Figure 3:
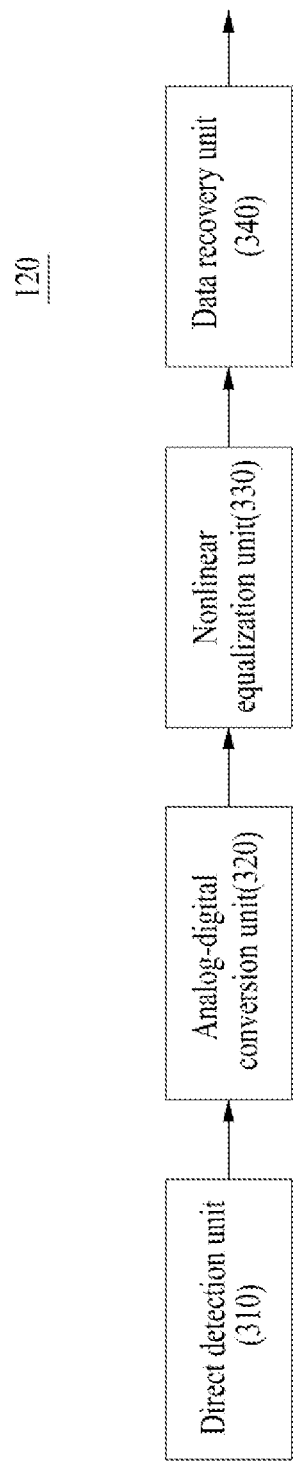
FIG. 3 is a drawing illustrating a receiver according to various example embodiments.

FIG. 3 is a drawing illustrating the receiver 120 according to various example embodiments.

Referring to FIG. 3, the receiver 120 according to various example embodiments may include a direct detection unit 310, an analog-digital conversion unit 320, a nonlinear equalization unit 330, and a data recovery unit 340. The direct detection unit 310 may perform direct detection (DD) on a signal received from the transmitter 110. The analog-digital conversion unit 320 may perform an analog-digital conversion on an input signal from the direct detection unit 310. The nonlinear equalization unit 330 may compensate for both linear and nonlinear distortions for an input signal from the analog-digital conversion unit 320. The data recovery unit 340 may recover data from an input signal from the nonlinear equalization unit 330.

Figure 4:
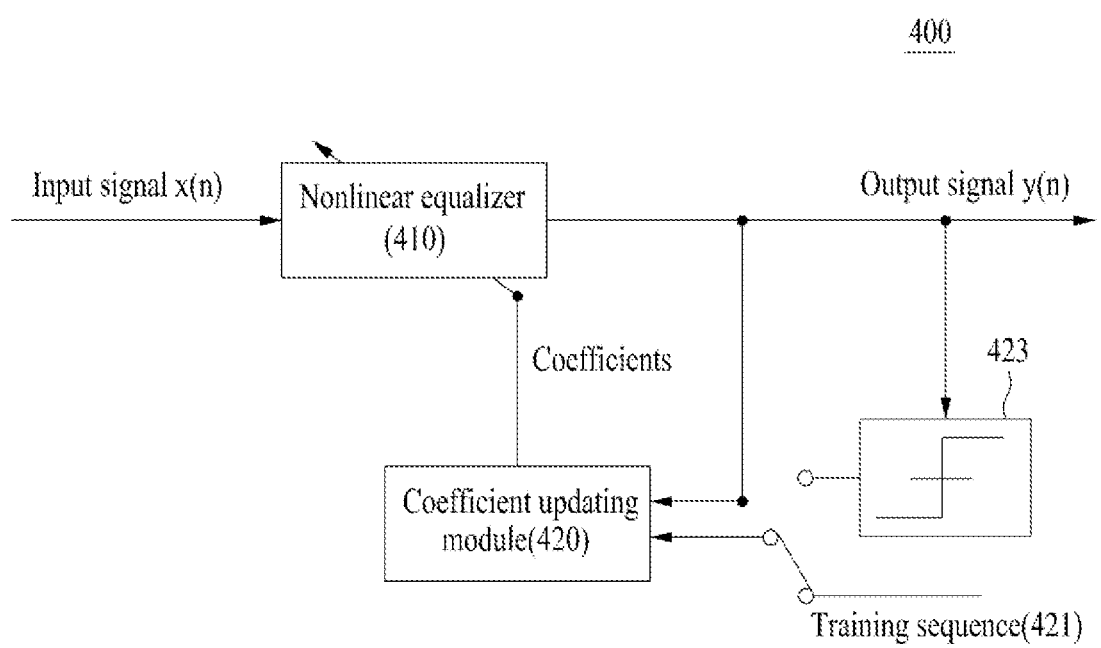
FIG. 4 is a drawing illustrating an apparatus for nonlinear equalization according to various example embodiments.

FIG. 4 is a drawing illustrating an apparatus for nonlinear equalization 400 according to various example embodiments.

Referring to FIG. 4, the apparatus for nonlinear equalization 400 may include a nonlinear equalizer 410 and a coefficient updating module 420. The nonlinear equalizer 410 may compensate for nonlinear distortions based on a matrix of coefficients obtained from the coefficient updating module 420. The coefficient updating module 420 may obtain coefficients through an adaptive algorithm by using a training sequence 421 or a decision module 423. At this time, the coefficients may be calculated according to an analytical expression of mean square error (MMSE) solution using a channel response.

According to various example embodiments, the nonlinear equalizer 410 may compensate for nonlinear distortions for an input signal. The apparatus for nonlinear equalization 400 having such nonlinear equalizer 410 may be applied to at least one of the nonlinear equalization unit 220 of the transmitter 110 or the nonlinear equalization unit 330 of the receiver 120. The nonlinear equalizer 410 may compensate for nonlinear distortions based on an absolute operation. At this time, the nonlinear equalizer 410 may compensate for nonlinear distortions such as below [Equation 1]. According to one example embodiment, in the below [Equation 1], some terms, e.g., terms with small value coefficients, may be pruned.

$$y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} + \quad \text{[Equation 1]}$$

$$\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)} f(x_{n-k_1},$$

$$x_{n-k_2}) \prod_{\lambda=3}^{p} x_{n-k_\lambda}$$

Here, n and k have an integer as a time index, the |•| cates an absolute operator, the $x_n$ indicates nth input signal to the nonlinear equalizer 410, $y_n$ indicates nth output signal from the nonlinear equalizer 410, the $L_p$ and the $h_p$ indicate memory length and coefficient of pth order terms, $f(x_{n-k_1}, x_{n-k_2})$ indicates an absolute operation based term and it may be represented as one of the below [Equation 2], [Equation 3], or [Equation 4]. Through this, the [Equation 1] may be represented as one of the below [Equation 5], [Equation 6], or [Equation 7], based on one of [Equation 2], [Equation 3], or [Equation 4].

$$f(x_{n-k_1}, x_{n-k_2}) = |x_{n-k_1} + x_{n-k_2}| \quad \text{[Equation 2]}$$

$$f(x_{n-k_1}, x_{n-k_2}) = |x_{n-k_1} - x_{n-k_2}| \quad \text{[Equation 3]}$$

$$f(x_{n-k_1}, x_{n-k_2}) = |x_{n-k_1} + x_{n-k_2}| - |x_{n-k_1} - x_{n-k_2}| \quad \text{[Equation 4]}$$

$$y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} + \quad \text{[Equation 5]}$$

$$\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)}$$

$$|x_{n-k_1} + x_{n-k_2}| \prod_{\lambda=3}^{p} x_{n-k_\lambda}$$

$$y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} + \quad \text{[Equation 6]}$$

$$\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)}$$

$$|x_{n-k_1} - x_{n-k_2}| \prod_{\lambda=3}^{p} x_{n-k_\lambda}$$

-continued $$y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$$   [Equation 7]

$$\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)} (|x_{n-k_1} + x_{n-k_2}| -$$

$$|x_{n-k_1} - x_{n-k_2}|) \prod_{\lambda=3}^{P} x_{n-k_\lambda}$$

Through this, whereas a general nonlinear equalizer compensates for nonlinear distortions based on a multiplication operation, the nonlinear equalizer 410 according to various example embodiments may compensate for nonlinear distortions based on an absolute operation. The multiplication operation has a high implementation complexity and may consume a lot of power than the absolute operation. However, the absolute operation may lower an implementation complexity by reducing degree of polynomial expression and may consume less power than the multiplication operation.

Figure 5:
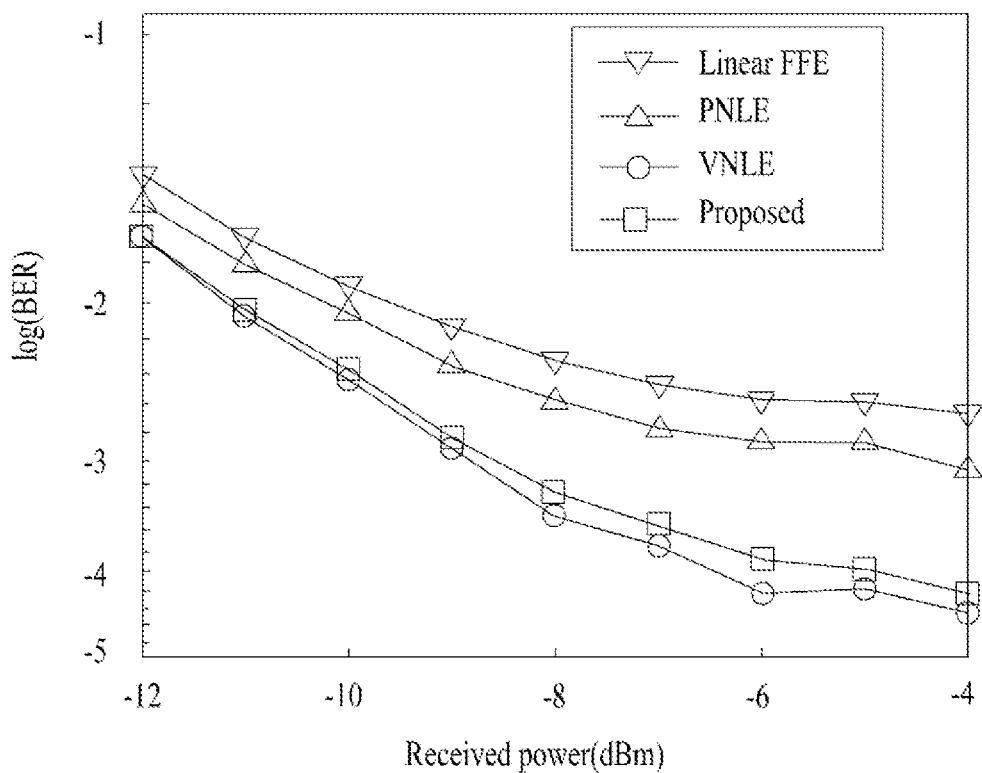
FIG. 5 is a drawing for illustrating performance of a nonlinear equalizer according to various example embodiments.

FIG. 5 is a drawing for illustrating performances of the nonlinear equalizer 410 according to various example embodiments. It is a result of bit error ratio measured of a 56-Gb/s 4-ary pulse amplitude modulation transmission system implemented by using 1.5-μm DML.

Referring to FIG. 5, the nonlinear equalizer 410 according to various example embodiments may achieve a similar performance with a Volterra nonlinear equalizer (VNLE). However, comparing with an implementation complexity of the VNLE, an implementation complexity of the nonlinear equalizer 410 according to various example embodiments may be reduced by about 50%. Accordingly, efficiency of the nonlinear equalizer 410 may be relatively high.

The apparatus for nonlinear equalization 400 according to various example embodiments may improve a transmission performance for a signal by effectively compensating for nonlinear distortions, based on an absolute operation. At this time, as the apparatus for nonlinear equalization 400 according to various example embodiments uses the absolute operation, the implementation complexity and power consumption may be reduced in comparison with a general apparatus for nonlinear equalization using a multiplication operation. In other words, the apparatus for nonlinear equalization 400 according to various example embodiments may reduce the implementation complexity and power consumption while having a certain level of performance, e.g., similar performance with Volterra nonlinear equalizer (VNLE).

The apparatus for nonlinear equalization 400 according to various example embodiments may include the coefficient updating module 420 for generating coefficients, and the nonlinear equalizer 410 configured to compensate for nonlinear distortions by using an absolute operation for an input signal, based on the coefficients.

According to various example embodiments, the nonlinear equalizer 410 may configure to compensate for nonlinear distortions by using a function including the absolute operation as one of the [Equation 5], [Equation 6], or [Equation 7].

According to various example embodiments, at least one of the terms of the function is absent.

According to various example embodiments, the coefficients may be calculated according to an analytical expression of a mean square error (MMSE) solution using a channel response.

According to various example embodiments, the coefficients may be obtained by an adaptive algorithm by using a training sequence or a decision module.

The operation method of the apparatus for nonlinear equalization 400 according to various example embodiments may include generating coefficients, and compensating for nonlinear distortions by using an absolute operation for an input signal, based on the coefficients, through the nonlinear equalizer 410.

The transmitter 110 according to various example embodiments may include the signal generation unit 210 configured to generate a signal for transmission, the nonlinear equalization unit 220 which has the nonlinear equalizer 410 configured to compensate for nonlinear distortions by using an absolute operation for an input signal from the signal generation unit 210, the digital-analog conversion unit configured to perform a digital-analog conversion on an input signal from the nonlinear equalization unit 220, and the intensity modulation unit 240 configured to perform intensity modulation on an input signal from the digital-analog conversion unit 230.

The receiver 120 according to various example embodiments may include the direct detection unit 310 configured to perform directly detection on an input signal, the analog-digital conversion unit 320 configured to perform an analog-digital conversion on an input signal from the direct detection unit 310, the nonlinear equalization unit 330 which has the nonlinear equalizer 410 configured to compensate for nonlinear distortions by using an absolute operation for an input signal from the analog-digital conversion unit 320, and the data recovery unit 340 configured to recover data from an input signal from the nonlinear equalization unit 330.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in the importance or the order. It is to be understood that if an element (e.g., a first element) is referred to as "coupled to (functionally or communicatively)" or "connected to" another element (e.g., a second element), it means that the element may be coupled with the other element directly, or via the other element (e.g., a third element).

The term "unit" used in the disclosure may include a module implemented in hardware, software, or firmware and may be interchangeably used with the terms logic, logical block, part, or circuit. The unit may be a minimum unit of an integrated part or may be a part thereof. The module may be a minimum unit for performing one or more functions or a part thereof. For example, the unit may include an application-specific integrated circuit (ASIC).

Various embodiments of this document may be implemented in the form of software including one or more instructions stored in a storage medium readable by a machine (e.g., the transmitter 110 and the receiver 120). For example, the processor of the machine may fetch at least one of one or more stored instructions from a storage medium, and may execute the one or more instructions. This enables the machine to perform at least one function based on the fetched at least one instruction. The one or more instructions may include code generated by a complier or code executable by an interpreter. The storage medium readable by the machine may be provided in the form of a non-transitory storage medium. In this case, 'non-transitory' means that a storage medium is a tangible device and does not include a signal (e.g., electromagnetic waves). The term is not used regardless of whether data is semi-persistently stored in a storage medium and whether data is temporally stored in a storage medium.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

What is claimed is:

1. An apparatus for nonlinear equalization in an optical communication system, the apparatus for nonlinear equalization comprising:
   an optical electronic device, wherein the optical electronic device comprises:
   a coefficient updating module for generating coefficients; and
   a nonlinear equalizer configured to compensate for nonlinear distortions by using an absolute operation for an input signal, based on the coefficients, wherein the nonlinear equalizer uses a function including the absolute operation as one equation selected from the group consisting of:

(i) $y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$ $\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)} |x_{n-k_1} + x_{n-k_2}| \prod_{\lambda=3}^{P} x_{n-k_\lambda};$ (ii) $y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$ $\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)}$ $|x_{n-k_1} - x_{n-k_2}| \prod_{\lambda=3}^{P} x_{n-k_\lambda};$ and (iii) $y_n =$ $\sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$ $\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)} |x_{n-k_1} -$ $x_{n-k_2}| \prod_{\lambda=3}^{P} x_{n-k_\lambda};$ wherein the n and k have an integer as a time index, the |•| indicates an absolute operator, the $x_n$ indicates nth input signal to the nonlinear equalizer, the $y_n$ indicates nth output signal from the nonlinear equalizer, and the $L_p$ and the $h_p$ indicate memory length and coefficient of pth order terms.

2. The apparatus according to claim 1, wherein at least one of the terms of the function is absent.

3. The apparatus according to claim 1, wherein the coefficients are calculated according to an analytical expression of a mean square error (MMSE) solution using a channel response.

4. The apparatus according to claim 1, wherein the coefficients are obtained by an adaptive algorithm by using a training sequence or a decision module.

5. A transmitter, comprising:
   a signal generation unit configured to generate a signal for transmission;
   a nonlinear equalization unit which has a nonlinear equalizer configured to compensate for nonlinear distortions by using an absolute operation for an input signal from the signal generation unit, wherein the nonlinear equalizer uses a function including the absolute operation as one equation selected from the group consisting of:

(i) $y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$ $\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)} |x_{n-k_1} + x_{n-k_2}| \prod_{\lambda=3}^{P} x_{n-k_\lambda};$ (ii) $y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$ $\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)}$ $|x_{n-k_1} - x_{n-k_2}| \prod_{\lambda=3}^{P} x_{n-k_\lambda};$ and (iii) $y_n =$ -continued $$\sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$$

$$\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)} |x_{n-k_1} - x_{n-k_2}| \prod_{\lambda=3}^{p} x_{n-k_\lambda};$$

wherein the n and k have an integer as a time index, the |•| indicates an absolute operator, the $x_n$ indicates nth input signal to the nonlinear equalizer, the $y_n$ indicates nth output signal from the nonlinear equalizer, and the $L_p$ and the $h_p$ indicate memory length and coefficient of pth order terms;

a digital-analog conversion unit configured to perform a digital-analog conversion on an input signal from the nonlinear equalization unit; and an intensity modulation unit configured to perform intensity modulation on an input signal from the digital-analog conversion unit.

6. A receiver, comprising:

a direct detection unit configured to perform directly detection on an input signal;

an analog-digital conversion unit configured to perform an analog-digital conversion on an input signal from the direct detection unit;

a nonlinear equalization unit which has a nonlinear equalizer configured to compensate for nonlinear distortions by using an absolute operation for an input signal from the analog-digital conversion unit, wherein the nonlinear equalizer uses a function including the absolute operation as one equation selected from the group consisting of:

(i) $y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$ $$\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)} |x_{n-k_1} + x_{n-k_2}| \prod_{\lambda=3}^{p} x_{n-k_\lambda};$$

(ii) $y_n = \sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$ $$\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)}$$

$$|x_{n-k_1} - x_{n-k_2}| \prod_{\lambda=3}^{p} x_{n-k_\lambda};$$

and (iii) $y_n =$ $$\sum_{k_1=0}^{L_1-1} h_{k_1}^{(1)} x_{n-k_1} + \sum_{p=2}^{P} \sum_{k=0}^{L_p-1} h_k^{(p)} |x_{n-k}| x_{n-k}^{p-1} +$$

$$\sum_{p=2}^{P} \sum_{k_1=0}^{L_p-1} \sum_{k_2=k_1+1}^{L_p-1} K \sum_{k_p=k_{p-1}+1}^{L_p-1} h_{k_1,k_2,\ldots,k_p}^{(p)} |x_{n-k_1} -$$

$$x_{n-k_2}| \prod_{\lambda=3}^{p} x_{n-k_\lambda};$$

wherein the n and k have an integer as a time index, the |•| indicates an absolute operator, the $x_n$ indicates nth input signal to the nonlinear equalizer, the $y_n$ indicates nth output signal from the nonlinear equalizer, and the $L_p$ and the $h_p$ indicate memory length and coefficient of pth order terms; and a data recovery unit configured to recover data from an input signal from the nonlinear equalization unit.

* * * * *